United States Patent
Itomi

(10) Patent No.: US 8,896,297 B2
(45) Date of Patent: Nov. 25, 2014

(54) ROTATING ANGLE DETECTING SENSOR

(75) Inventor: Shoji Itomi, Kuwana (JP)

(73) Assignee: NTN Corporation, Osaka (JP)

(*) Notice: Subject to any disclaimer, the term of this patent is extended or adjusted under 35 U.S.C. 154(b) by 282 days.

(21) Appl. No.: 13/389,818

(22) PCT Filed: Aug. 27, 2010

(86) PCT No.: PCT/JP2010/064576
§ 371 (c)(1),
(2), (4) Date: Feb. 10, 2012

(87) PCT Pub. No.: WO2011/030676
PCT Pub. Date: Mar. 17, 2011

(65) Prior Publication Data
US 2012/0146630 A1  Jun. 14, 2012

(30) Foreign Application Priority Data
Sep. 8, 2009  (JP) ................. 2009-206972

(51) Int. Cl.
G01B 7/30 (2006.01)
G01R 33/025 (2006.01)
G01D 5/14 (2006.01)

(52) U.S. Cl.
CPC ..................................... *G01D 5/145* (2013.01)
USPC ................................ 324/207.25; 324/207.12

(58) Field of Classification Search
None
See application file for complete search history.

(56) References Cited

U.S. PATENT DOCUMENTS

| | | | |
|---|---|---|---|
| 7,030,606 B2 | 4/2006 | Kato et al. | |
| 2003/0070497 A1* | 4/2003 | Kikuchi et al. | 73/862.333 |

2004/0217758 A1  11/2004  Leonard

FOREIGN PATENT DOCUMENTS

| | | |
|---|---|---|
| JP | 9-145732 | 6/1997 |
| JP | 2003-121197 | 4/2003 |
| JP | 2004-191101 | 7/2004 |
| JP | 2005-291942 | 10/2005 |
| JP | 2007-40850 | 2/2007 |
| JP | 2009-053093 | 3/2009 |
| WO | 2007/055135 | 5/2007 |
| WO | 2009/028407 | 3/2009 |
| WO | WO 2009028407 A1 * | 3/2009 |
| WO | WO 2009031607 A1 * | 3/2009 |

OTHER PUBLICATIONS

International Search Report issued Oct. 12, 2010 in International (PCT) Application No. PCT/JP2010/064576.
Chinese Office Action issued Jan. 13, 2014, in corresponding Application No. 201080035193.4 with English translation.

* cited by examiner

*Primary Examiner* — Patrick Assouad
*Assistant Examiner* — Courtney McDonnough
(74) *Attorney, Agent, or Firm* — Wenderoth, Lind & Ponack, LLP

(57) ABSTRACT

An angle detection error is prevented by using a columnar permanent magnet that is radially double-pole-magnetized as a rotating angle detecting sensor while preventing a gap between a plurality of magnetic sensors and an end face of the permanent magnet from being narrowed. The permanent magnet is a ferrite magnet or an alnico magnet having a diameter of 4 mm to 20 mm, and an axial length of 3 mm to 5 mm. The plurality of magnetic sensors detects radial magnetic flux densities at positions axially spaced 0.5 mm to 3.0 mm apart from a central portion of the permanent magnet, the central portion having a diameter equal to or smaller than 20% of the magnet diameter to make it possible to perform detection in a range in which a distribution curve of a radial magnetic flux density has a moderate inclination.

11 Claims, 13 Drawing Sheets

ROTATING ANGLE DETECTING SENSOR

BACKGROUND OF THE INVENTION

1. Field of the Invention

The present invention relates to a noncontact rotating angle detecting sensor that can detect a relative rotating angle between two members by using a permanent magnet and a magnetic sensor.

2. Description of Related Art

As a rotating angle detecting sensor of this type, a sensor including a columnar permanent magnet and a plurality of magnetic sensors that are arranged on the same circumference at a position axially spaced apart from one end face of the permanent magnet. The rotating angle detecting sensor of this type includes a permanent magnet fixed to one member of two members between which a relative rotating angle is desired to be detected, a plurality of magnetic sensors fixed to the other member, and a processing circuit that converts a rotating angle of a relative concentric rotation of the two members into a rotating magnetic field of the permanent magnet to calculate the rotating angle by an operation using an output difference between the plurality of magnetic sensors. In the fixing, as far as possible, a center line of the permanent magnet, center of the circumference on which the plurality of magnetic sensors are arranged, and rotating centers of the relative rotation between the two members are arranged on the same straight line (Unexamined Japanese Patent Publication No. 2004-191101).

Conventionally, as the permanent magnet, a permanent magnet that is obtained by radially double-pole-magnetizing a columnar shaped body is used. The permanent magnet of this type has the N pole on a half and the S pole on the other half, when the magnetic field is divided by an axial plane including the center line of the columnar shape. The plurality of magnetic sensors detects magnetic flux densities to detect a rotating angle. As far as possible, the plurality of magnetic sensors are advantageously arranged in a space having a large absolute value of a magnetic flux density to avoid a gap between the magnetic sensor and one end face of the permanent magnet from being narrowed. For example, when an axial magnetic flux density along the center line of the permanent magnet is detected by the plurality of magnetic sensors, since a peak of an axial magnetic flux density distribution curve is located at a position axially spaced apart from an outer edge of one end face of the permanent magnet, the position is set as a normal arrangement position of the plurality of magnetic sensors (Unexamined Japanese Patent Publication No. 2005-291942).

However, when the axial magnetic flux density distribution in a space axially spaced from one end face of the permanent magnet is considered on an arbitrary plane including the center line of the permanent magnet, a curve representing the magnetic flux density distribution has a narrow radial region in which the curve has a moderate inclination near the peak. For this reason, when so-called decentering in which the center of the columnar permanent magnet and the center of the same circumference on which the plurality of magnetic sensors are arranged are relatively decentered occurs, each of the magnetic sensors enters a diametric region having a sharp magnetic flux density change, an output different from an output from a magnetic sensor corresponding to an actual rotating angle is obtained, and an angle detection error between a rotating angle calculated by a rotating angle detecting sensor and the actual rotating angle between the two members easily becomes large. In order to reduce the angle detection error, the rotating angle detecting sensor disclosed in Unexamined Japanese Patent Publication No. 2005-291942 employs a permanent magnet having a crucible former or a stepped shape at one end in place of the columnar permanent magnet. However, the permanent magnet is difficult to be designed by the special shaping.

SUMMARY OF THE INVENTION

In consideration of the above circumstances, it is an object of the invention to prevent an angle detection error by using a columnar permanent magnet that is radially double-pole-magnetized as a rotating angle detecting sensor while avoiding a gap between a magnetic sensor and one end face of the permanent magnet from being narrowed.

In order to solve the above problem, in various columnar permanent magnets that are radially double-pole-magnetized, magnetic flux density distributions between a space axially spaced apart from one end face of the permanent magnet are examined. The "axial direction" mentioned here is a direction along the center line of the permanent magnet. The "radial direction" mentioned here is a direction orthogonal to the axial direction. The "columnar shape" is a solid body having the same external diameter in an entire axial area. The "radially double-pole-magnetized" is radial magnetization that is performed such that the N pole and the S pole are generated in a semi-columnar area of the permanent magnet and the remaining semi-columnar area, respectively. The "magnetic sensor" is a functional portion that converts a radial magnetic flux density into an electric signal. As results of an examination, it was found that a curve representing a radial magnetic flux density distribution on an arbitrary plane including the center line of the permanent magnet has peaks (absolute values) at two positions in a radial region larger than a magnet diameter and a radial region smaller than the magnet diameter, the large radial region includes a range having a moderate inclination from a positive peak to a large-diameter side, the small diameter region includes a range having a moderate inclination from a negative peak to a large-diameter side or the small-diameter side, the ranges having the moderate inclinations can be obtained more widely than that of an axial magnetic flux density distribution, and, when absolute values at positions having the same distance from the center line of the permanent magnet on an axial extension between the ranges having the moderate inclinations in the large and small diameter regions are compared with each other, the absolute value is larger in the small-diameter region than in the large-diameter region. On the basis of the knowledge, in the invention, since a magnetic sensor is arranged such that a radial magnetic flux density is detected in the range having the moderate inclination in the small-diameter region that is advantageous to avoid a gap between the magnetic sensor and the permanent magnet from being narrowed, a columnar permanent magnet that is radially double-pole-magnetized is employed in the rotating angle detecting sensor, and an angle detection error can be prevented while avoiding the gap between the magnetic sensor and one end face of the permanent magnet from being narrowed.

More specifically, the invention employs a configuration in which a rotating angle detecting sensor including a columnar permanent magnet and a plurality of magnetic sensors arranged on the same circumference at a position axially spaced apart from one end face of the permanent magnet, the permanent magnet being formed by a magnet that is made of an entire uniform material having a columnar shape and that is radially double-pole-magnetized, wherein the permanent magnet is formed by a ferrite magnet or an alnico magnet having a diameter of 4 mm to 20 mm and an axial length of 3 mm to 5 mm, and the plurality of magnetic sensors are arranged to detect a radial magnetic flux density at a position spaced 0.5 mm to 3.0 mm apart from a central portion having a diameter equal to or smaller than 20% of the magnet diameter on one end face of the permanent magnet to cause the magnetic sensors to perform detection in a range having a moderate inclination in the small-diameter region.

The plurality of magnetic sensors are preferably arranged to detect radial magnetic flux densities at a position spaced 0.5 mm to 1.5 mm apart from a central portion having a diameter equal to or smaller than 10% of the magnet diameter on one end face of the permanent magnet.

As a result of an analysis of the radial magnetic flux density distribution curve, it was found that, at the position spaced 0.5 mm to 1.5 mm apart from the central portion having a diameter equal to or smaller than 10% of the magnet diameter on one end face of the permanent magnet, even though the entire permanent magnet is inclined at a gradient of $1/20$ with reference to the axial direction, a radial magnetic flux density change caused by the inclination is smaller than that in another region. When the magnetic sensors are arranged to detect the magnetic flux densities, an angle detection error can be prevented not only in occurrence of decentering but in relative occurrence of the gradient between the permanent magnet and the same circumference on which the plurality of magnetic sensors are arranged.

When an allowed decentering amount is set between the center of the same circumference and the center line of the permanent magnet, the magnet diameter is determined on the basis of the decentering amount to make it possible to arrange the magnetic sensors at a position axially spaced apart from the central portion having a diameter equal to or smaller than 20% of the magnet diameter.

More specifically, the magnet diameter is preferably 5 times or more the sum of the maximum diameter of the same circumference and a decentering amount allowed between the center of the same circumference and the center line of the permanent magnet. The "maximum diameter of the same circumference" is a diameter of a rotating circular track drawn by one of the magnetic sensors at a position farthest from the center, when a center of virtual rotating movement where one of the plurality of magnetic sensors is overlapped on the other magnetic sensor (more specifically, the center of the same circumference on which the plurality of magnetic sensors are arranged) is considered.

As a typical example in which the decentering amount is generated, there is given a configuration including a shaft to which the permanent magnet is fixed and a housing that supports the shaft by a bearing unit and in which the plurality of magnetic sensors are fixed. In this case, the decentering amount is determined on the basis of a radial clearance set between the shaft and the housing.

The radial clearance, for example, a fit between the bearing unit arranged in the housing and the shaft, a radial internal clearance obtained when the bearing unit is a rolling bearing, or a fit between an outer ring and the housing. Since the decentering amount is allowed to be set, as the bearing unit that supports the shaft, a bearing unit that can maintain the permanent magnet within a range of the decentering amount is preferably used. For example, a preload is given to the rolling bearing to obtain a negative radial clearance, or fit quality between a slide bearing and the shaft is moderated to make it possible to configure a rotating angle detecting sensor having high output precision.

In particular, the permanent magnet is fixed to one end of the shaft, and the magnet diameter is preferably 10 times or more the sum of the maximum diameter of the same circumference and the radial clearance.

When the radial clearance is set between the shaft and the housing, the shaft can be inclined depending on the radial clearance. When the permanent magnet is fixed to one end of the shaft, an inclination having the gradient is generated by the inclination of the shaft. When the magnet diameter is 10 times or more the sum, in a rotating angle detecting sensor of this type, since the magnetic sensors can be arranged at a position axially spaced from the central portion having a diameter equal to or smaller than 10% of the magnet diameter on one end face of the permanent magnet, an angle detection error can be prevented even though the gradient is relatively generated.

A sensor array obtained by integrating the plurality of magnetic sensors can be employed. The sensor array can save the trouble of arranging the magnetic sensors one by one, and is convenient for simplification of the sensor configuration. Alternatively, the plurality of magnetic sensors is fixed on the same circumference having an arrangement center unique to the sensor array. When a radial position of the magnetic sensor is determined on the basis of the magnet diameter, the magnetic sensor can be arranged at a predetermined radial direction even by employing the sensor array.

A configuration including a shaft, a housing that supports the shaft with a bearing unit, and a circuit board on which the plurality of magnetic sensors are mounted, wherein the permanent magnet is fixed to one end of the shaft, the other end of the shaft is exposed to the outside of the housing, the housing contains the permanent magnet and the plurality of magnetic sensors and has a housing lid having a flat portion facing one end of the shaft in an axial direction, and the circuit board is fixed to the flat portion of the housing lid is employed to make it possible to unitize a rotating angle detecting sensor.

The unitized rotating angle detecting sensor is incorporated in another device by using one of the two members that are relatively rotated as a shaft, connecting the shaft to one member, using the other member as a housing, or fixing the housing to the other member to make it possible to detect a relative rotating angle between the two members. For example, the sensor is used to detect a rotating angle between two members that are relatively rotated such as a drive shaft and a machine body in general industrial machinery or a construction machine.

There can be employed a configuration in which, when the unitization is performed, the bearing unit is configured by a rolling bearing incorporated between the shaft and the housing and an outer ring of the bearing unit is pushed by the housing lid to give a preload. The unit gives a preload to the rolling bearing to improve bearing rigidity and to prevent decentering of the shaft, and can use the lid for preload to support the plurality of magnetic sensors.

There can be employed a configuration in which, when the preload is given, the housing lid, the shaft, and an inner ring and an outer ring of the bearing unit, and a rolling element are made of a ferromagnetic material, a contact portion to the outer ring is arranged around the flat portion of the housing lid, and the plurality of magnetic sensors are arranged in a magnetic shield space formed by the housing lid, the shaft, and the bearing.

When the housing lid, the shaft, and the inner ring and the outer ring of the rolling bearing are made of a ferromagnetic member, and when a periphery of the flat portion of the housing lid is brought into contact with the outer ring, a ferromagnetic shield that is a kind of magnetic shield can be formed by the housing lid, the shaft, and the rolling bearing. On the basis of a positional relationship between the housing lid, one end of the shaft, and the outer ring, the ferromagnetic shield can be arranged such that all magnetic field lines straight extending from the outside of the housing to the magnetic sensor cross any one of the housing lid and the like. Magnetic field lines of an external magnetic field cannot straightly reach the inside of the magnetic shield space in which the ferromagnetic shield is effective, and are guided to a detour formed by the housing lid, the outer ring, the rolling element, the inner ring, and the shaft that are successive. Since the plurality of magnetic sensors is arranged in the magnetic shield space, a detection error of a magnetic flux density generated by an external magnetic field can be prevented. Since the magnetic shield is formed by the housing lid, the shaft, and the rolling bearing, a material of the housing main body to which the housing lid is fixed can be freely selected. For example, when the housing main body is formed by resin injection molding or made of an aluminum alloy, the housing can be reduced in weight.

There can be employed a configuration in which the flat portion is recessed from the circumference thereof on one end side, and the circuit board is sealed with a resin such that the circuit board does not reach a portion between the plurality of magnetic sensors and one end face of the permanent magnet.

When the flat portion of the housing lid is recessed on one end side, the circuit board can be sealed with a resin by using the inner wall of the recessed portion as a mold. Since the resin seal layer does not reach a portion between the plurality of magnetic sensors and one end face of the permanent magnet, the resin seal layer does not hinder the gap setting between the permanent magnet and the magnetic sensors.

When there is employed a configuration including a shaft and a housing that supports the shaft with a bearing unit, wherein the permanent magnet is fixed to one end of the shaft, the housing contains the permanent magnet and the plurality of magnetic sensors, and the plurality of magnetic sensors are located in a magnetic shield space formed by the shaft made of a ferromagnetic material and another member, an angle detection error caused by an external magnetic field can be prevented by a magnetic shield using the shaft.

As a result of an analysis of a curve of the magnetic flux density distribution in the radial direction when the configuration according to the magnetic shield is employed, it was understood that, when the permanent magnet is a ferrite magnet having a diameter of 4 mm to 6 mm and an axial length of 3 mm to 5 mm, in comparison with an alnico magnet having the same size, an absolute value at a position axially spaced apart from a central portion having a diameter equal to or smaller than 20% of the magnet diameter on one end face of the permanent magnet is large. Thus, when the configuration according to the magnetic shield and the permanent magnet are employed, a gap between the magnetic sensor and one end face of the permanent magnet can be prevented from being narrowed while using a ferrite magnet cheaper than an alnico magnet.

As described above, according to the invention, by using a columnar permanent magnet that is radially double-pole-magnetized in the rotating angle detecting sensor, when the positions of the plurality of magnetic sensors that detect radial magnetic flux densities, the outer size and the type of the permanent magnet, and the gap between the magnetic sensors and one end face of the permanent magnet have the specific relationship, an angle detection error can be prevented while preventing the gap between the magnetic sensors and one end face of the permanent magnet from being narrowed.

DETAILED DESCRIPTION OF THE INVENTION

Figure 1B:
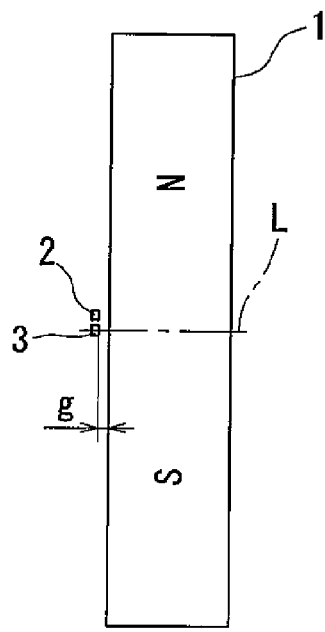
FIG. 1(b) is a side view of the rotating angle detecting sensor according to the first embodiment.
Figure 1A:
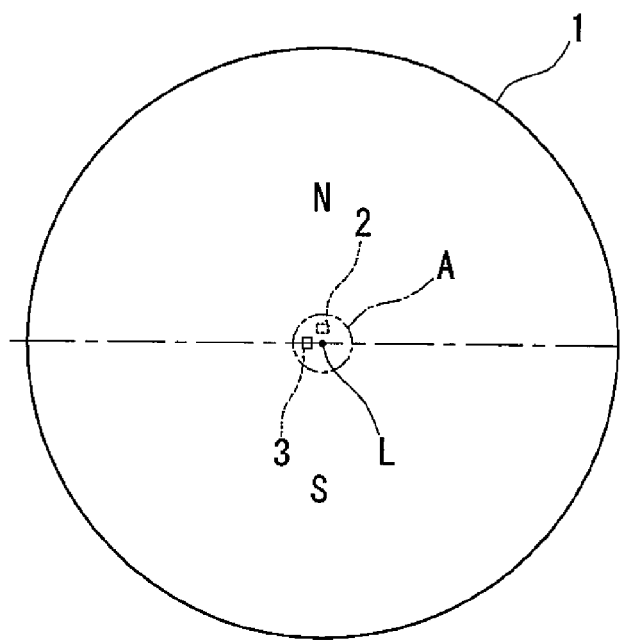
FIG. 1(a) is a front view of a rotating angle detecting sensor according to a first embodiment.
Figure 1C:
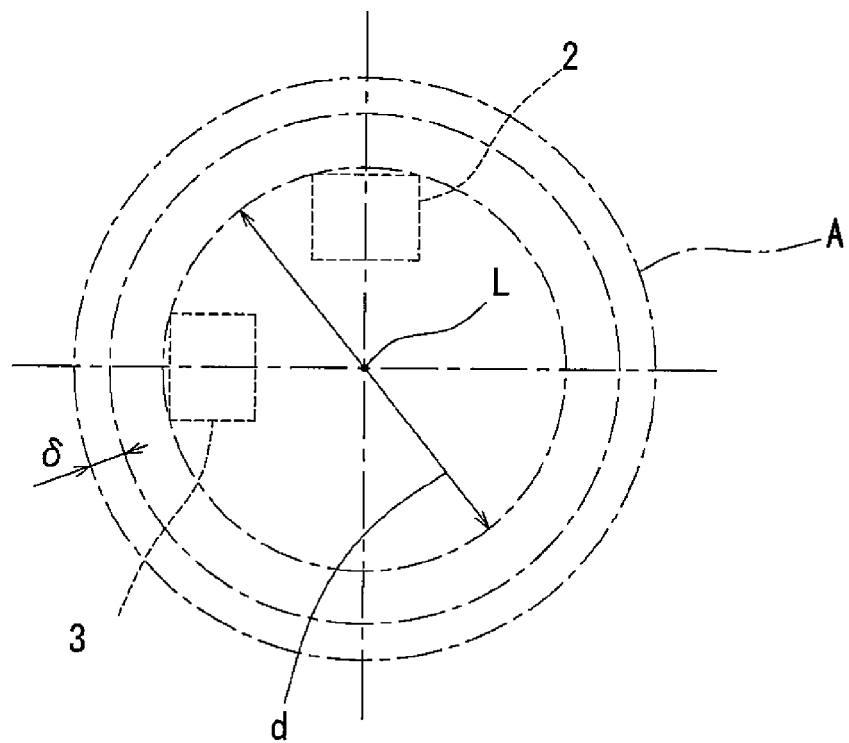
FIG. 1(c) is an enlarged diagram of a central portion on one end face of the permanent magnet in FIG. 1(a).

As shown in FIG. 1, a rotating angle detecting sensor (to be simply referred to as a "first embodiment" hereinafter) according to a first embodiment includes a columnar permanent magnet 1 and a plurality of magnet sensors 2 and 3 arranged on the same circumference at positions axially spaced apart from one end face of the permanent magnet 1.

The permanent magnet 1 includes a ferrite magnet or an alnico magnet that is obtained by radially double-pole-magnetizing a shaped body having a columnar shape and formed by an entirely uniform material. The shaped body has anisotropy in the radial direction. The permanent magnet 1 has the N pole in a semi-columnar area and the S pole in the remaining semi-columnar area.

Each of the magnet sensors 2 and 3 shown in FIG. 1 is configured by a functional part that converts a radial magnetic flux density into an electronic signal. For example, each of the magnet sensors 2 and 3 is configured by a magneto-sensitive unit arranged in a magnetic detection element such as a general-purpose hall element arranged to detect a radial magnetic flux density, an MR (Magneto-Resistive) element, and an MI (Magneto-Impedance) element. The magneto-sensitive unit is a part that causes an output variation depending on a magnetic flux density crossing the radial direction. The magneto-sensitive unit of the hall element is configured by a semiconductor thin film unit arranged, for example, in a direction orthogonal to the radial direction. The magneto-sensitive unit of the MR element is configured by, for example, a ferromagnetic thin film unit, or a current conducting path of a uniaxial anisotropic ferromagnetic thin film unit. The magneto-sensitive unit of the MI element is configured by, for example, a magnetic conductor unit in which an impedance change is detected by causing a minute high-frequency current to flow in the magnetic conductor unit. There can also be employed a sensor array obtained by integrating the plurality of magnet sensors 2 and 3 or an integrated circuit obtained by appropriately integrating a signal amplifying circuit, an AD converter circuit, a storing circuit, a signal processing circuit, or the like, in addition to at least one magnetic sensor.

The permanent magnet 1 is fixed to one end of a shaft 4 defined as one member of two members that are relatively rotated, and a plurality of magnet sensors 2 and 3 are fixed to the other member (not shown). As a result, the plurality of magnet sensors 2 and 3 are arranged on the same circumference at positions axially spaced apart from one end face of the permanent magnet 1 to have a rotating angle difference of 90° about the center of the same circumference. The permanent magnet 1, the plurality of magnet sensors 2 and 3, and the two member are arranged such that, as far as possible, the center line of the permanent magnet 1, the center of the same circumference on which the magnet sensors 2 and 3 are arranged, and a rotating central axis of relative rotations of the two members are arranged on the straight line L. As a matter of course, the components are ideally arranged on a straight line L.

In the first embodiment, by the 90° arrangement described above, outputs having a phase difference of 90° between the plurality of magnet sensors 2 and 3 can be obtained. A signal processing circuit (not shown) that calculates a rotating angle of relative concentric rotations of the plurality of magnet sensors 2 and 3 and the permanent magnet 1 by an operation using an output difference between the plurality of magnet sensors 2 and 3 is arranged. The center lines of the relative concentric rotations are on the straight line L including the center line of the permanent magnet 1 and the center of the same circumference on which the plurality of magnet sensors 2 and 3 are arranged. The signal processing circuit can be arbitrarily employed. For example, when an output from the magnetic sensor 2 is Vx, an output from the magnetic sensor 3 is Vy, and a rotating angle is θ, the rotating angle is given by θ=arctan (Vx/Vy) when |Vx|≤|Vy| is satisfied, and the rotating angle is given by θ=arccot (Vx/Vy) when |Vx|≥|Vy| is satisfied. A vector rotating system disclosed in Unexamined Japanese Patent Publication No. 2004-191101 may also be used. The arrangement of the plurality of magnet sensors 2 and 3 is not limited to the above 90° arrangement, and the rotating angle difference may be arbitrarily determined in the range that does not hinder the detection. For temperature compensation, a magnetic sensor having a phase difference of 180° with respect to the magnetic sensor 2 and a magnetic sensor having a phase difference of 180° with respect to the magnetic sensor 3 can be added.

When the permanent magnet 1 was fixed to one end of the shaft 4 serving as one of the members, the magnet diameter, the axial length, and the peripheral environment of the permanent magnet 1 were set by the following Condition 1 to Condition 5, radial magnetic flux densities in a space axially spaced apart from one end face of the permanent magnet 1 were analyzed.

Figure 2:
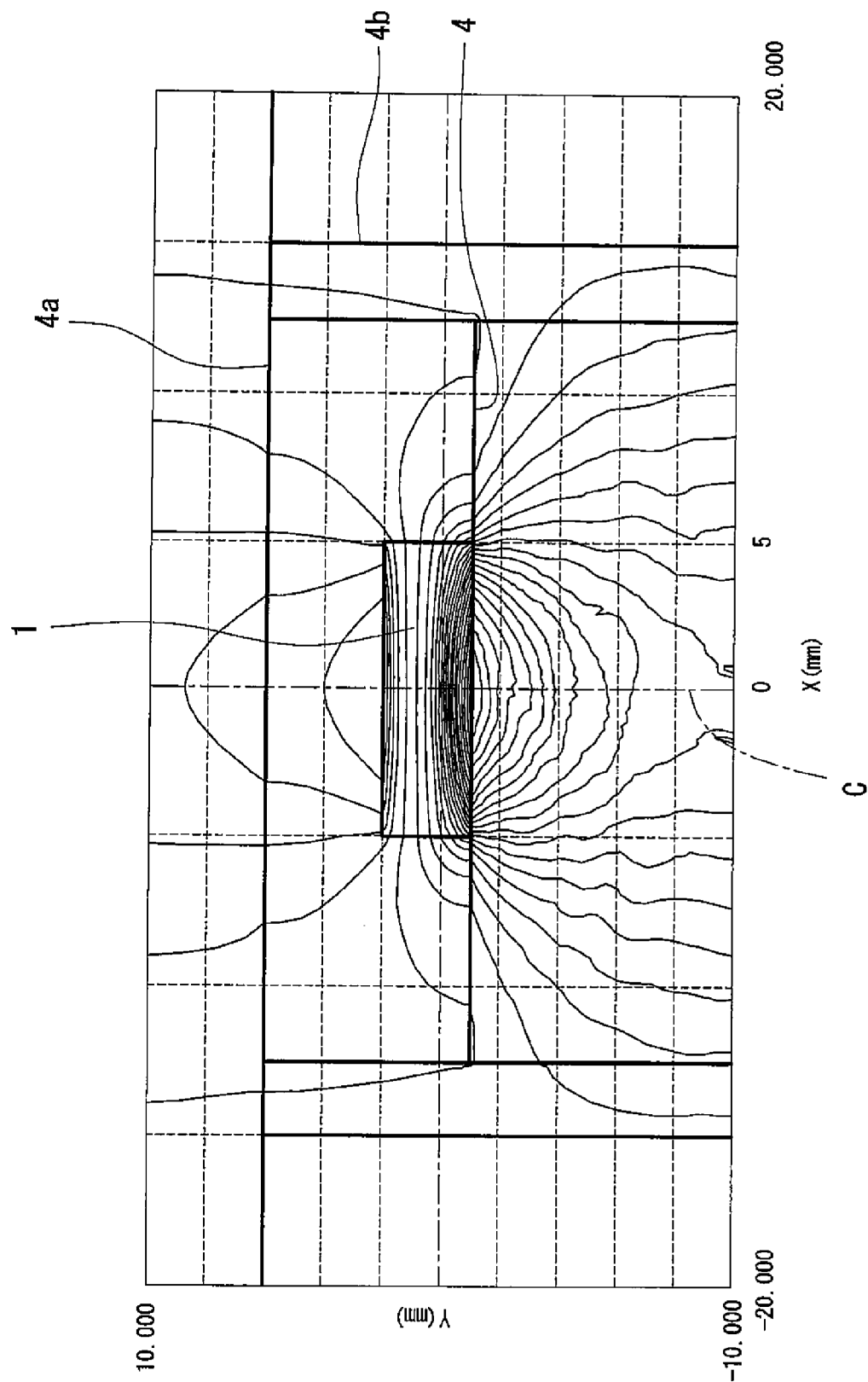
FIG. 2 is a magnetic flux distribution diagram showing an analysis model and a magnetic field analysis on a plane including a center line of a permanent magnet.
Figure 3A:
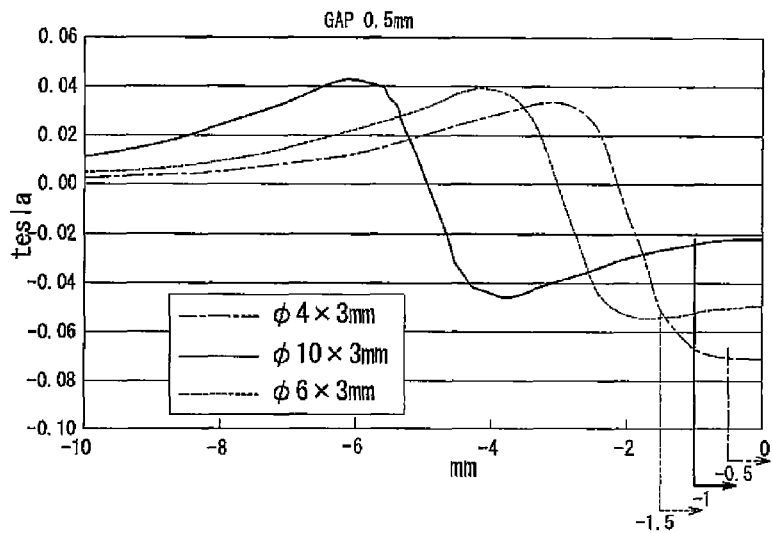
FIG. 3(a) is a magnetic flux density distribution diagram in a radial direction when a gap is 0.5 mm in Condition 1 of the analysis model in FIG. 2.
Figure 3B:
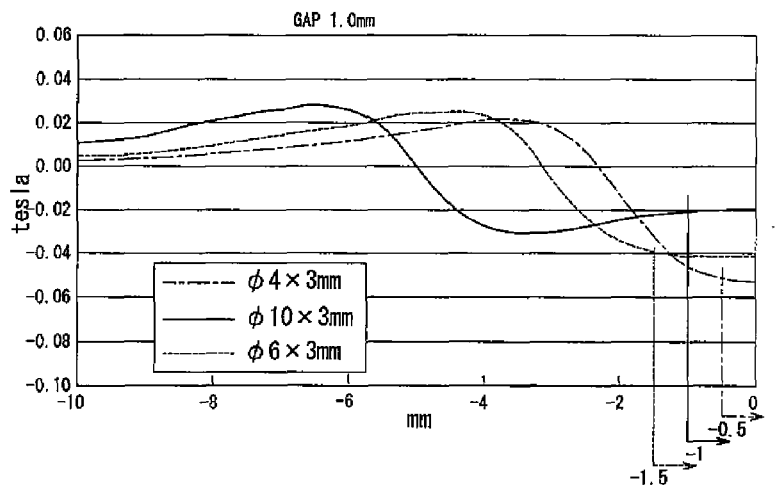
FIG. 3(b) is a magnetic flux density distribution diagram in the radial direction when a gap is 1.0 mm in Condition 1.
Figure 3C:
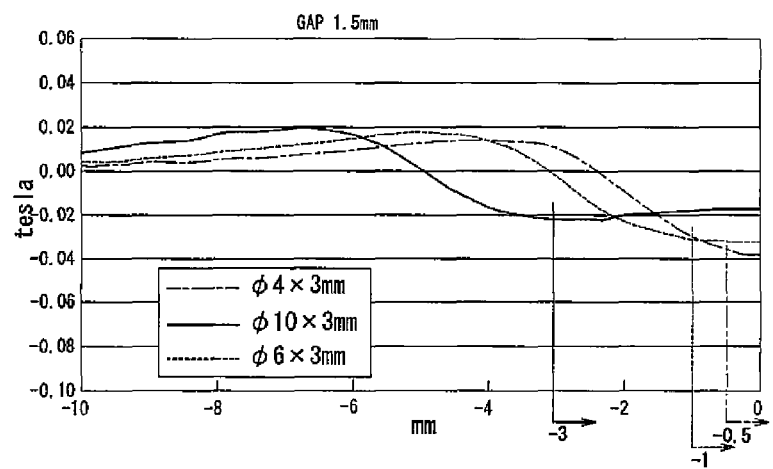
FIG. 3(c) is a magnetic flux density distribution diagram in the radial direction when a gap is 1.5 mm in Condition 1.
Figure 4A:
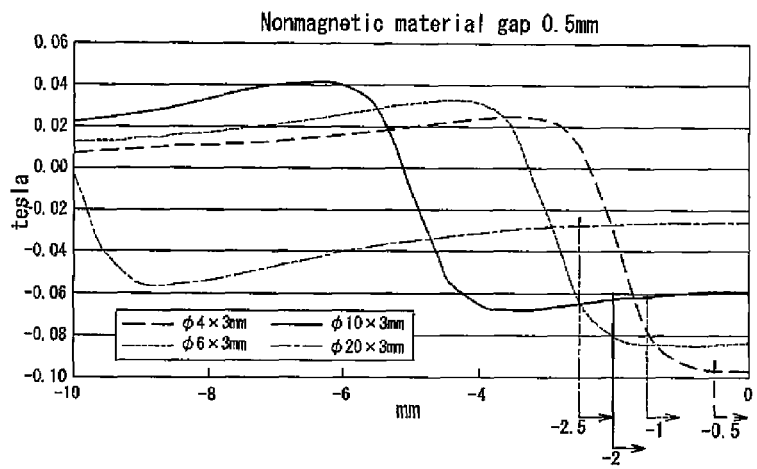
FIG. 4(a) is a magnetic flux density distribution diagram in a radial direction when a gap is 0.5 mm in Condition 2 of the analysis model in FIG. 2.
Figure 4B:
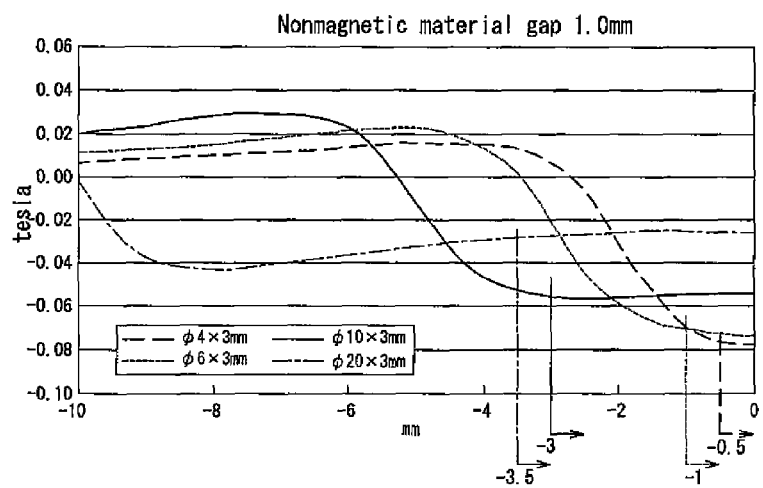
FIG. 4(b) is a magnetic flux density distribution diagram in a radial direction when a gap is 1.0 mm in Condition 2 of the analysis model in FIG. 2.
Figure 4C:
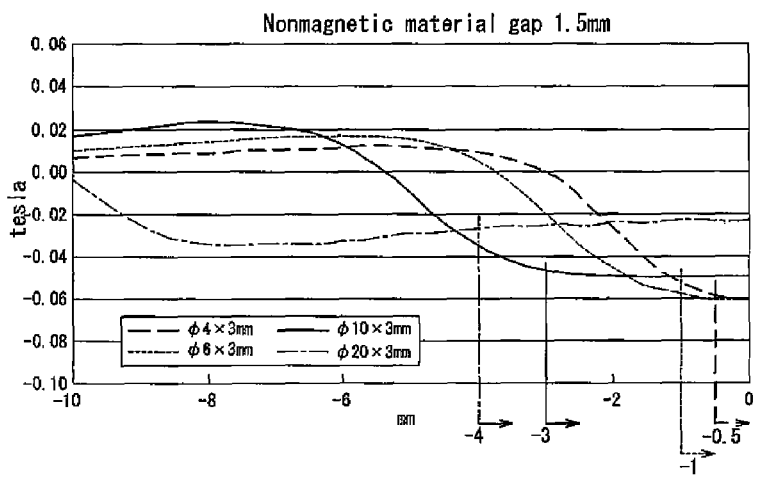
FIG. 4(c) is a magnetic flux density distribution diagram in a radial direction when a gap is 1.5 mm in Condition 2 of the analysis model in FIG. 2.
Figure 4D:
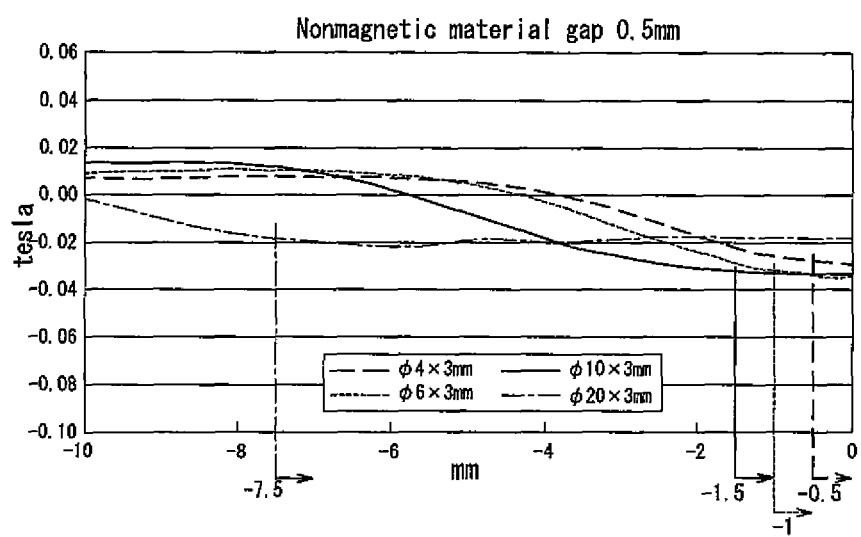
FIG. 4(d) is a magnetic flux density distribution diagram in a radial direction when a gap is 3.0 mm in Condition 2 of the analysis model in FIG. 2.

Condition 1: The condition corresponds to an analysis condition in which, as in an analysis space shown in FIG. 2, the shaft 4 being in contact with the permanent magnet 1, the permanent magnet 1, and other members 4a and 4b that surround a magnetic sensor (not shown) together with the shaft 4 are made ferromagnetic, spaces between the permanent magnet 1, the shaft 4, and the other members 4a and 4b are filled with air, and the permanent magnet 1 and the magnet sensors 2 and 3 are arranged in a magnetic shield formed by the shaft 4 and the other members 4a and 4b. The other members 4a and 4b are, for example, a housing containing the permanent magnet 1 and the plurality of magnet sensors 2 and 3, a magnet holder, a screw member that fastens the magnet holder to one end face of the main body of the shaft 4, and the like. In each of analysis models in which the permanent magnet 1 is ferrite magnets each having an axial length of 3 mm and magnet diameters of 10 mm, 6 mm, and 4 mm, a radial magnetic flux distribution on an arbitrary plane including the center line of the permanent magnet 1 was analyzed. FIG. 2 shows an example of the magnetic flux distribution. An abscissa X (mm) in FIG. 2 is set at a position in the radial direction, and a point O on the abscissa X is on the center line of the permanent magnet 1. An ordinate Y (mm) in FIG. 2 is set at a position in the axial direction, and a point O on the ordinate Y is at a level 1 mm axially spaced apart from the other end face of the permanent magnet 1. As radial magnetic flux density distributions on the arbitrary plane, distributions on a straight line orthogonal to the axial direction at positions spaced by axial gaps of 0.5 mm, 1.0 mm, and 1.5 mm from one end face of the permanent magnet 1 were calculated. FIGS. 3(*a*), 3(*b*), and 3(*c*) show calculation results of the radial magnetic flux density distributions, respectively. In FIG. 3, the abscissa (mm) corresponds to the abscissa in FIG. 2, and an ordinate [T] was set to a radial magnetic flux density (tesla).

Condition 2: In Condition 1, the shaft 4 was made nonmagnetic, the analysis space was changed into a nonmagnetic shield space, a model having a magnet diameter of 20 mm and a model in which an axial gap from one end face of the permanent magnet 1 was 3.0 mm were added. FIGS. 4(*a*), 4(*b*), 4(*c*), and 4(*d*) show radial magnetic flux density distributions, respectively. Ordinates and abscissas in FIGS. 4(*a*) to 4(*d*) are the same as those in FIG. 3.

Figure 5A:
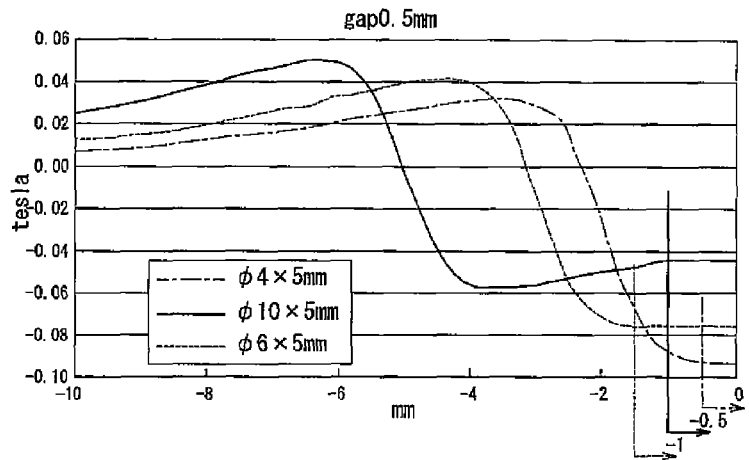
FIG. 5(a) is a magnetic flux density distribution diagram in a radial direction when a gap is 0.5 mm in Condition 3 of the analysis model in FIG. 2.
Figure 5B:
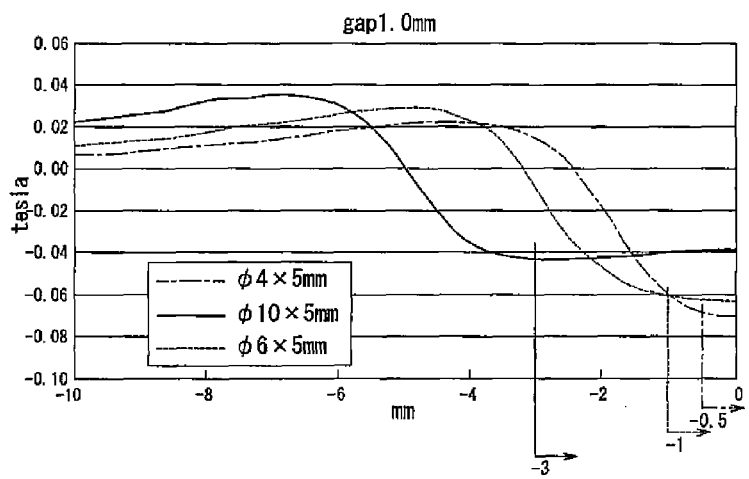
FIG. 5(b) is a magnetic flux density distribution diagram in the radial direction when a gap is 1.0 mm in Condition 3.
Figure 5C:
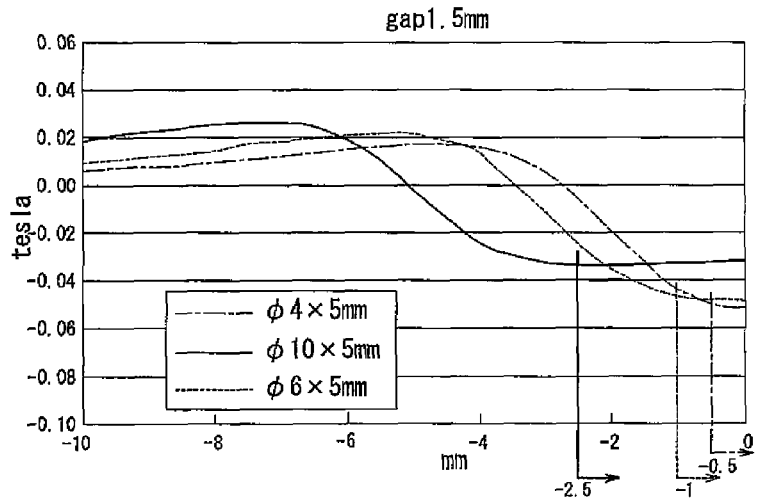
FIG. 5(c) is a magnetic flux density distribution diagram in the radial direction when a gap is 1.5 mm in Condition 3.

Condition 3: In Condition 1, an axial direction of the permanent magnet 1 was changed into 5 mm. FIGS. 5(*a*), 5(*b*), and 5(*c*) show calculation results of the radial magnetic flux density distributions, respectively. Ordinates and abscissas in FIG. 5 are the same as those in FIG. 3.

Figure 6A:
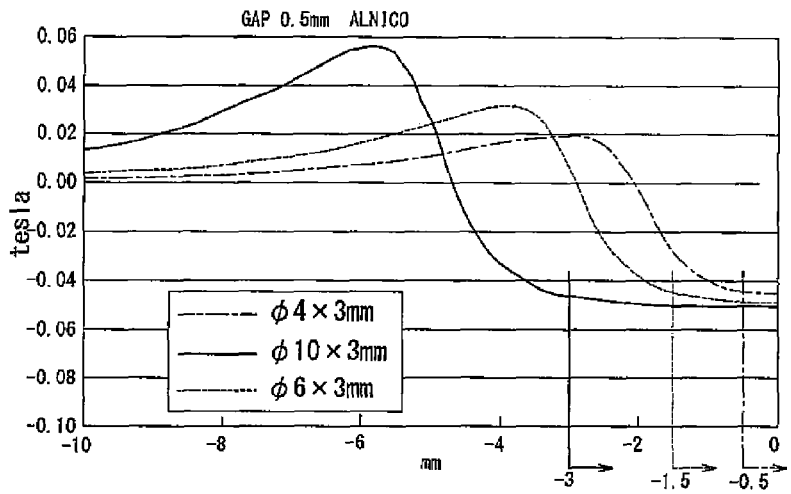
FIG. 6(a) is a magnetic flux density distribution diagram in a radial direction when a gap is 0.5 mm in Condition 4 of the analysis model in FIG. 2.
Figure 6B:
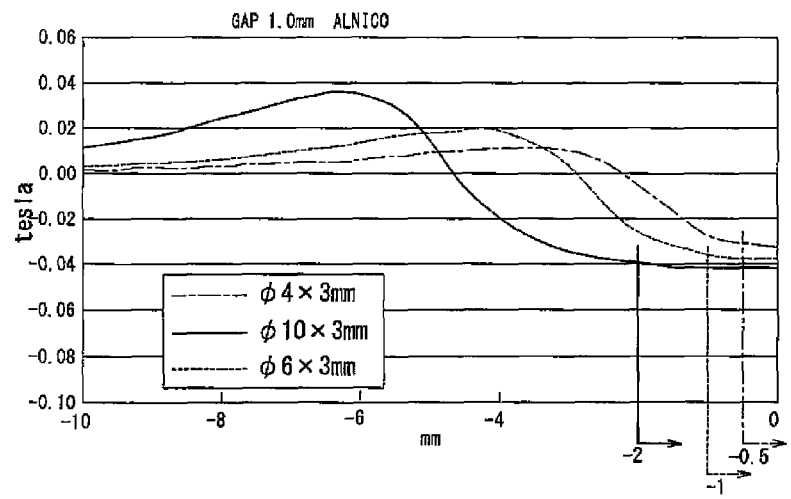
FIG. 6(b) is a magnetic flux density distribution diagram in the radial direction when a gap is 1.0 mm in Condition 4.
Figure 6C:
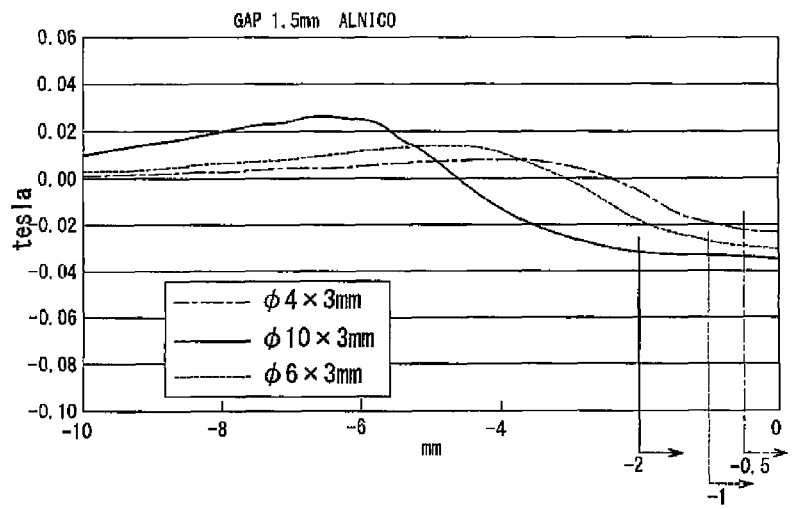
FIG. 6(c) is a magnetic flux density distribution diagram in the radial direction when a gap is 1.5 mm in Condition 4.

Condition 4: In Condition 1, the permanent magnet 1 was changed into an alnico magnet. FIGS. 6(*a*), 6(*b*), and 6(*c*) show calculation results of the radial magnetic flux density distributions, respectively. Ordinates and abscissas in FIG. 6 are the same as those in FIG. 3.

Figure 7A:
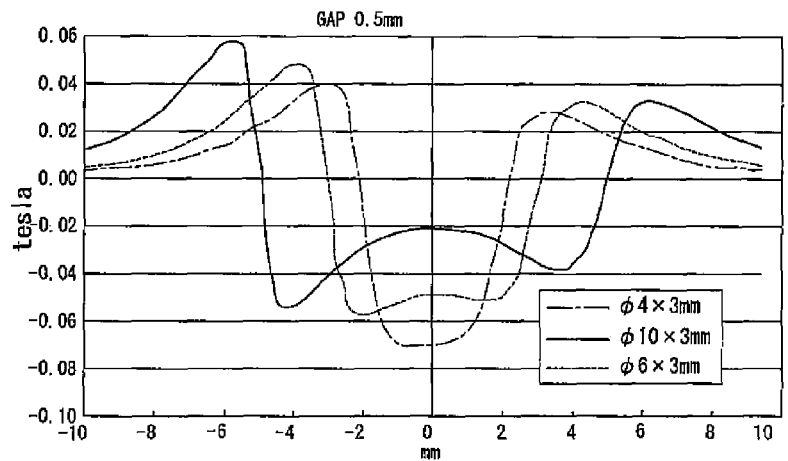
FIG. 7(a) is a magnetic flux density distribution diagram in a radial direction when a gap is 0.5 mm in Condition 5 of the analysis model in FIG. 2.
Figure 7B:
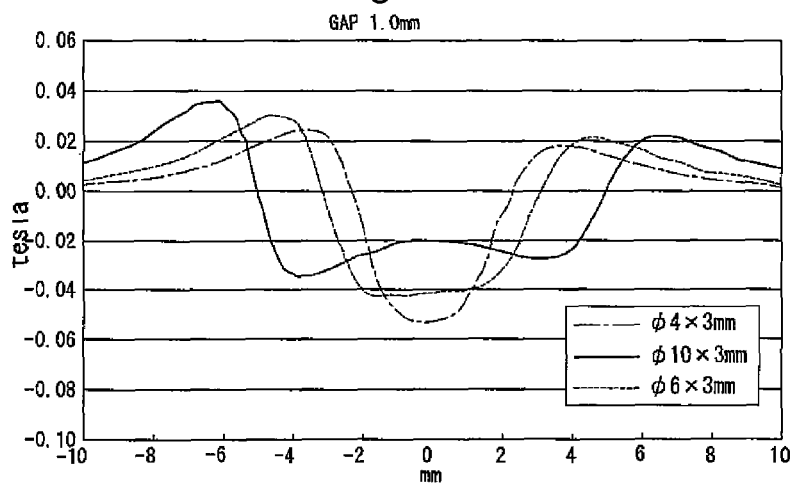
FIG. 7(b) is a magnetic flux density distribution diagram in the radial direction when a gap is 1.0 mm in Condition 5.
Figure 7C:
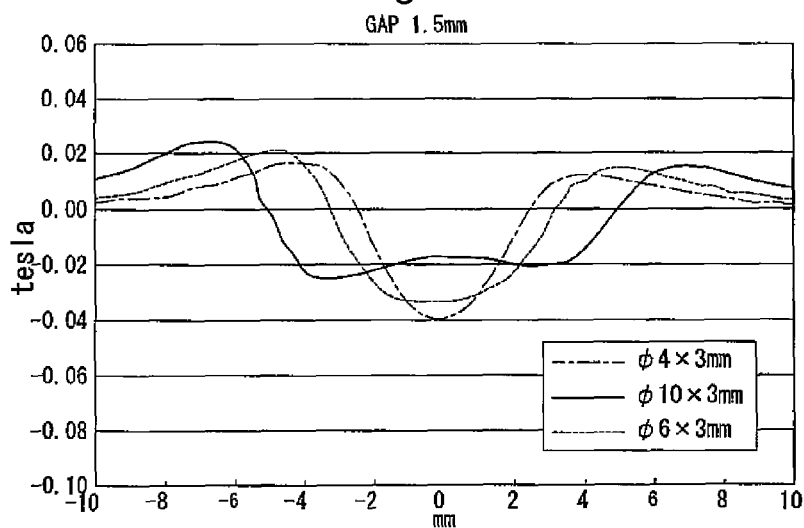
FIG. 7(c) is a magnetic flux density distribution diagram in the radial direction when a gap is 1.5 mm in Condition 5.

Condition 5: In Condition 1, the positions of radial magnetic flux density distributions to be calculated were changed into positions on straight lines extending from the center line on one end face of the permanent magnet 1 through gaps of 0.5 mm, 1.0 mm, and 1.5 mm and each having a gradient of ½0 with reference to the axial direction. FIGS. 7(a), 7(b), and 7(c) show calculation results of the radial magnetic flux density distributions, respectively. Ordinates and abscissas in FIG. 7 are the same as those in FIG. 3. The left side of the graph in FIG. 7 that is a side on which the permanent magnet 1 is inclined is a side on which the analysis position is close to the magnet, and the right side is a side on which the analysis position is far from the magnet. Condition 5 corresponds to a condition in which, in Condition 1, a state in which the entire permanent magnet 1 is inclined at the same gradient with reference to the axial direction is analyzed.

In magnetic flux density distributions in FIGS. 3(a), 3(b), and 3(c) to FIGS. 7(a), 7(b), and 7(c), a list obtained such that radial position ranges in which distribution curves are moderate and that are suitable position for the magnet sensors 2 and 3 in FIG. 1 are specified by ratios to the magnet diameters is shown in Table 1.

absolute value of a magnetic flux density in the radial direction is larger in Condition 3 than in Condition 1. For this reason, when a gap g from one end face of the permanent magnet 1 to the magnet sensors 2 and 3 is desired to be increased, the axial length is advantageously increased.

In Condition 4 using an alnico magnet, in comparison with Condition 1 using a ferrite magnet, when the magnet diameter is large, the absolute value of a magnetic flux density near a central portion in the radial direction becomes large. For this reason, when the gap g between one end face of the permanent magnet 1 and the magnet sensors 2 and 3 needs to be large, an alnico magnet is employed to increase the magnet diameter so as to make it possible to set the large gap g.

When Condition 1, Condition 3, and Condition 4 are compared with each other, absolute values of magnetic flux densities near the magnet centers in Condition 1 and Condition 3 having the magnet diameters of 6 mm and 4 mm are larger than that in Condition 4. For this reason, when the magnet diameter in Condition 1 is employed, by using a ferrite magnet that is cheaper than an alnico magnet, the gap g between one end face of the permanent magnet 1 and the magnet sensors 2 and 3 can be set to be large.

TABLE 1

| Magnet diameter | Gap | Condition 1 | Condition 2 | Condition 3 | Condition 4 | Condition 5 |
| --- | --- | --- | --- | --- | --- | --- |
| φ20 | 0.5 mm | — | 25% or less | — | — | — |
|  | 1.0 mm | — | 35% or less | — | — | — |
|  | 1.5 mm | — | 40% or less | — | — | — |
|  | 3.0 mm | — | 75% or less | — | — | — |
| φ10 | 0.5 mm | 20% or less | 40% or less | 20% or less | 60% or less | 10% or less |
|  | 1.0 mm | 20% or less | 60% or less | 60% or less | 40% or less | 20% or less |
|  | 1.5 mm | 60% or less | 60% or less | 50% or less | 40% or less | 20% or less |
|  | 3.0 mm | — | 30% or less | — | — | — |
| φ6 | 0.5 mm | 50% or less | 50% or less | 50% or less | 50% or less | 17% or less |
|  | 1.0 mm | 50% or less | 33% or less | 33% or less | 33% or less | 33% or less |
|  | 1.5 mm | 50% or less | 33% or less | 33% or less | 33% or less | 17% or less |
|  | 3.0 mm | — | 33% or less | — | — | — |
| φ4 | 0.5 mm | 25% or less | 25% or less | 25% or less | 25% or less | 25% or less |
|  | 1.0 mm | 25% or less | 25% or less | 25% or less | 25% or less | 13% or less |
|  | 1.5 mm | 25% or less | 25% or less | 25% or less | 25% or less | 13% or less |
|  | 3.0 mm | — | 25% or less | — | — | — |

Under the condition of each cell in Table 1, when a percentage in the corresponding cell is given by N, positions where the plurality of magnetic sensors 2 and 3 are spaced only a gap of the cell apart from a central portion A having a diameter equal to or smaller than N % of a magnet diameter on one end face of the permanent magnet 1 are suitable for detection of the magnetic sensors 2 and 3.

According to Table 1, a radial direction range suitable for detection of the magnet sensors 2 and 3 is influenced by changes of the materials, magnet diameters, axial lengths, and peripheral environments of the permanent magnet 1.

For example, in Condition 2 having no magnetic shield, in comparison with Condition 1 having a magnetic shield, an inclination of a distribution curve near the magnet center is small, in comparison with Condition 1, an angle detection error caused by decentering can be preferably decreased. However, since Condition 2 is not magnetically shielded and is easily influenced by external magnetic force, at a position where external magnetic force is present, an application of the position corresponding to a range in each radial direction of Condition 2 is unsuitable.

Condition 3 in which an axial length of the permanent magnet 1 is 5 mm has a tendency similar to a tendency of an inclination of a curve near the magnetic center in which an axial length of the permanent magnet 1 is 3 mm. However, an When Condition 1 and Condition 5 are compared with each other, a change in magnetic flux density is larger on a side close to the permanent magnet 1 (left side of the graph) than on a side far from the permanent magnet 1 (right side of the graph). In Condition 5, since an inclination on the left side of the graph increases, a radial direction range suitable for the magnet sensors 2 and 3 is narrower than that in Condition 1.

In each of FIGS. 3 to 7, at positions that are radially spaced apart from the center of one end face of the permanent magnet 1, although inclinations of magnetic flux density curves become moderate (for example, an inclination is small near a position of 10 mm), absolute values of the magnetic flux densities are smaller than that obtained at a position near the center. For this reason, the gap g between the magnet sensors 2 and 3 and the permanent magnet 1 needs to be set to be narrow. When the positions of the magnet sensors 2 and 3 are far from the center line of the permanent magnet 1, the configuration of the sensor disadvantageously becomes large. Thus, the magnet sensors 2 and 3 are preferably arranged at positions axially spaced apart from the central portion A of one end face of the permanent magnet 1.

When the arrangement ranges of the magnet sensors 2 and 3 are determined in consideration of only decentering, attention is preferably given to radial ranges in Conditions 1 to 4 in which radial magnetic flux density distributions on the straight line orthogonal to the axial direction are analyzed. According to the radial range in each of Condition 1 to Condition 4, a position axially spaced 0.5 mm to 3.0 mm apart from a central portion having a diameter equal to or smaller than 20% of the magnet diameter on one end face of the permanent magnet 1 corresponds to a position suitable for detecting the magnet sensors 2 and 3 in all Condition 1 to Condition 4.

When the arrangement ranges of the magnet sensors 2 and 3 are determined in consideration of not only decentering but also the inclination of the entire permanent magnet 1 with respect to the axial direction, attention is preferably given to each radial range in Condition 5 in which a radial magnetic flux density distribution on the straight line having the gradient with reference to the axial direction is analyzed. According to the radial range in each of Condition 5, a position axially spaced 0.5 mm to 3.0 mm apart from a central portion having a diameter equal to or smaller than 10% of the magnet diameter on one end face of the permanent magnet 1 corresponds to a position suitable for detecting the magnet sensors 2 and 3 in all Condition 1 to Condition 5.

On the basis of the above analysis results, on the assumption that the permanent magnet 1 is a ferrite magnet or an alnico magnet having a diameter of 4 mm to 20 mm and an axial length of 3 mm to 5 mm, the magnet sensors 2 and 3 is conceived to be preferably detected at positions axially spaced 0.5 mm to 3.0 mm apart from the central portion A having a diameter equal to or smaller than 10% of the magnet diameter on one end face of the permanent magnet 1.

More specifically, a decentering amount δ is allowed between the shaft 4 and the center line of the permanent magnet 1 arranged on the straight line L in FIG. 1 and the center of the same center of the same circumference on which the plurality of magnet sensors 2 and 3 are arranged. The magnet diameter is 10 times or more of the sum of a maximum diameter d of the same circumference and the decentering amount δ. With this arrangement, even though decentering amount δ is generated, the plurality of magnet sensors 2 and 3 are fastened to the position axially spaced apart from the central portion A on one end face of the permanent magnet 1. Thus, in the first embodiment, by using the columnar permanent magnet that is radially double-pole-magnetized as a rotating angle detecting sensor, while avoiding the gap g between the magnet sensors 2 and 3 and one end face of the permanent magnet 1 from being narrowed, an angle detection error can be prevented even though relative decentering and an inclination between the permanent magnet 1 and the magnet sensors 2 and 3 occur.

In the first embodiment, as the bearing unit that supports the shaft 4, a bearing unit that can maintain the permanent magnet 1 within the range of the decentering amount δ may be used. For this reason, for example, a preload is given to a rolling bearing to form a negative radial clearance, or fit quality between a slide bearing and the shaft 4 is moderated to make it possible to configure a rotating angle detecting sensor having high output precision.

Figure 8:
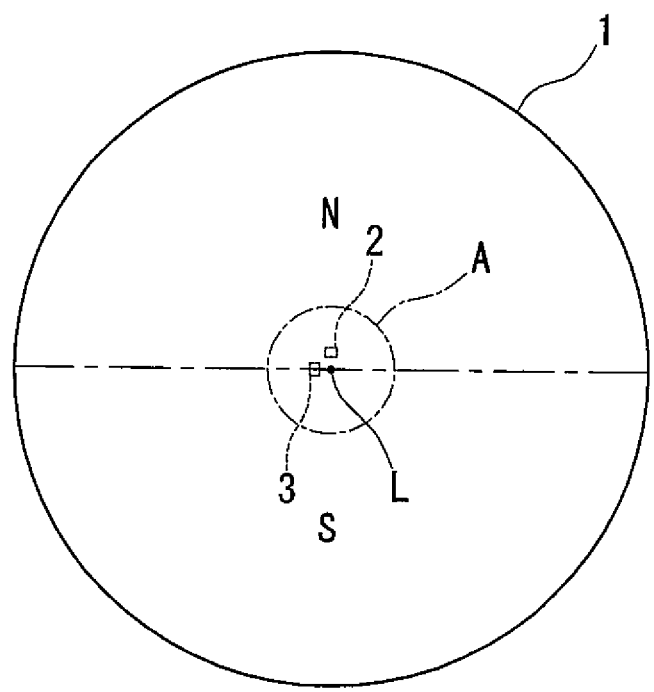
FIG. 8 is a front view of a rotating angle detecting sensor according to a second embodiment.

A second embodiment is shown in FIG. 8. Different points between the second embodiment and the first embodiment will be mainly described below. The plurality of magnet sensors 2 and 3 are arranged to detect a radial magnetic flux density at a position axially spaced 0.5 mm to 3.0 mm apart from the central portion A having a diameter equal to or smaller than 20% of a magnet diameter on one end face of the permanent magnet 1. With this arrangement, even though decentering amount δ is generated, the plurality of magnet sensors 2 and 3 are fastened to the position axially spaced apart from the central portion A on one end face of the permanent magnet 1. Thus, the second embodiment can prevent an angle detection error even though decentering occurs.

Figure 9:
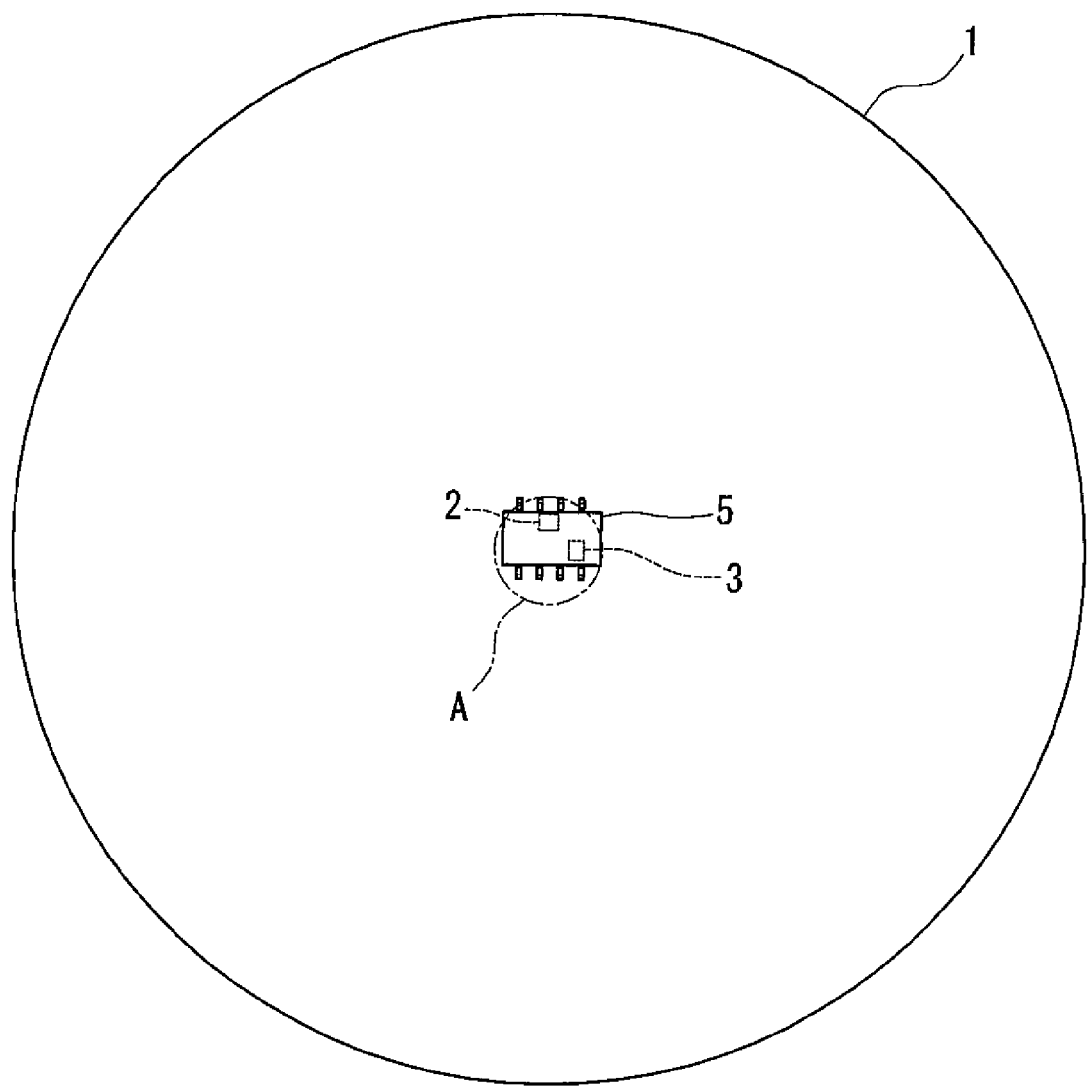
FIG. 9 is a front view of a rotating angle detecting sensor according to a third embodiment.

A third embodiment is shown in FIG. 9. In the third embodiment, a sensor array 5 obtained by integrating magnet sensors 2 and 3 is employed in the second embodiment. A magnet diameter is set to be 5 times or more of the sum of a maximum diameter d (see FIG. 1(c)) of the same circumference of the magnet sensors 2 and 3 unique to the sensor array 5 and the decentering amount δ.

EXAMPLE

Figure 10:
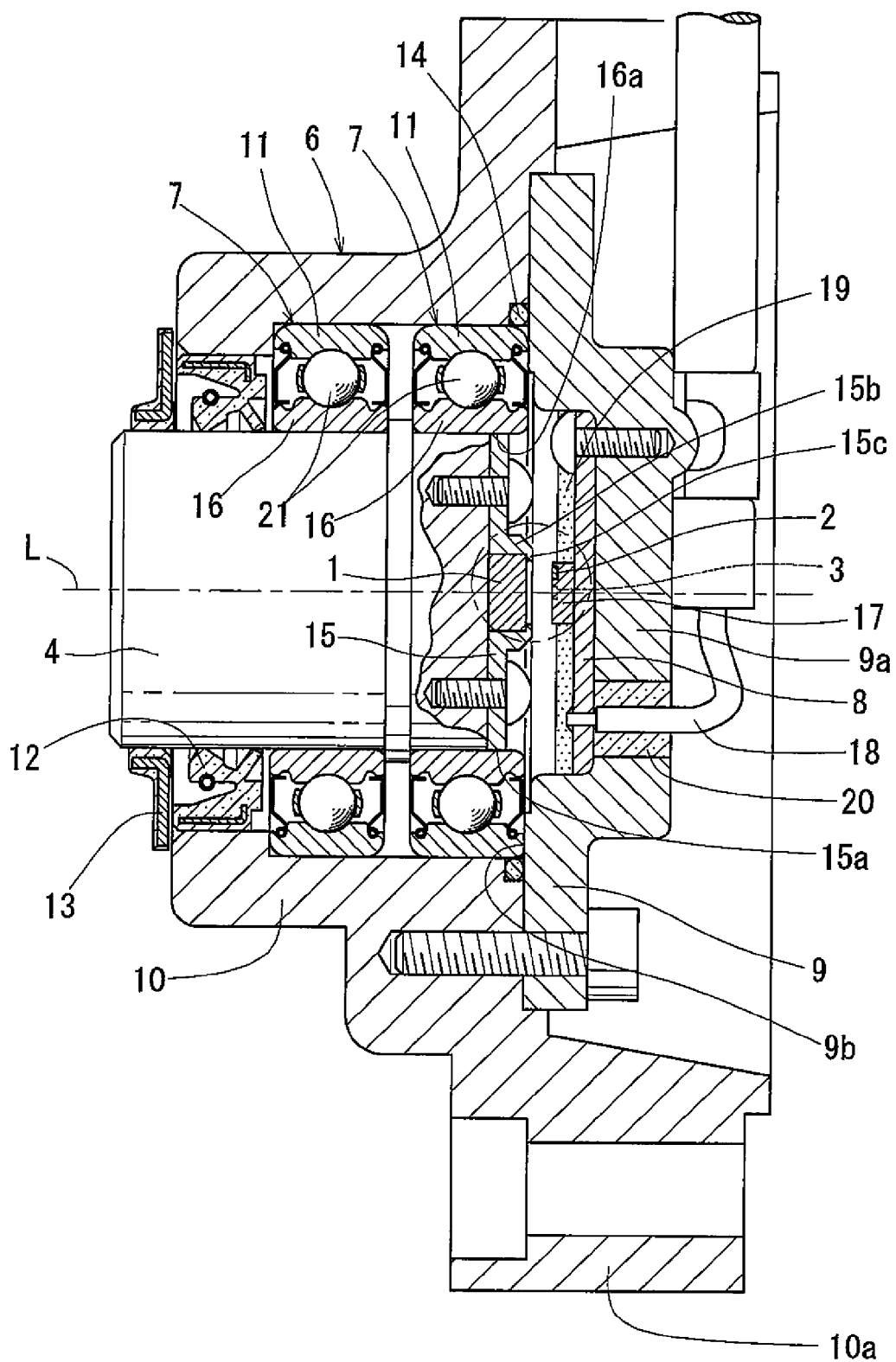
FIG. 10 is a vertical sectional side view of the rotating angle detecting sensor according to Example 1.

FIG. 10 shows Example 1. As shown in the drawing, Example 1 includes the shaft 4, a housing 6, and a circuit board 8 on which a sensor array is mounted. The housing 6 supports the shaft 4 with a bearing unit 7. The permanent magnet 1 is fixed to one end of the shaft 4. The other end of the shaft 4 is exposed to the outside of the housing 6. The housing 6 is arranged to contain the permanent magnet 1 and the circuit board 8. The housing 6 has a housing main body 10 in which the bearing unit 7 is arranged and a housing lid 9 having a flat portion 9a facing one end of the shaft 4 in the axial direction.

Figure 11:
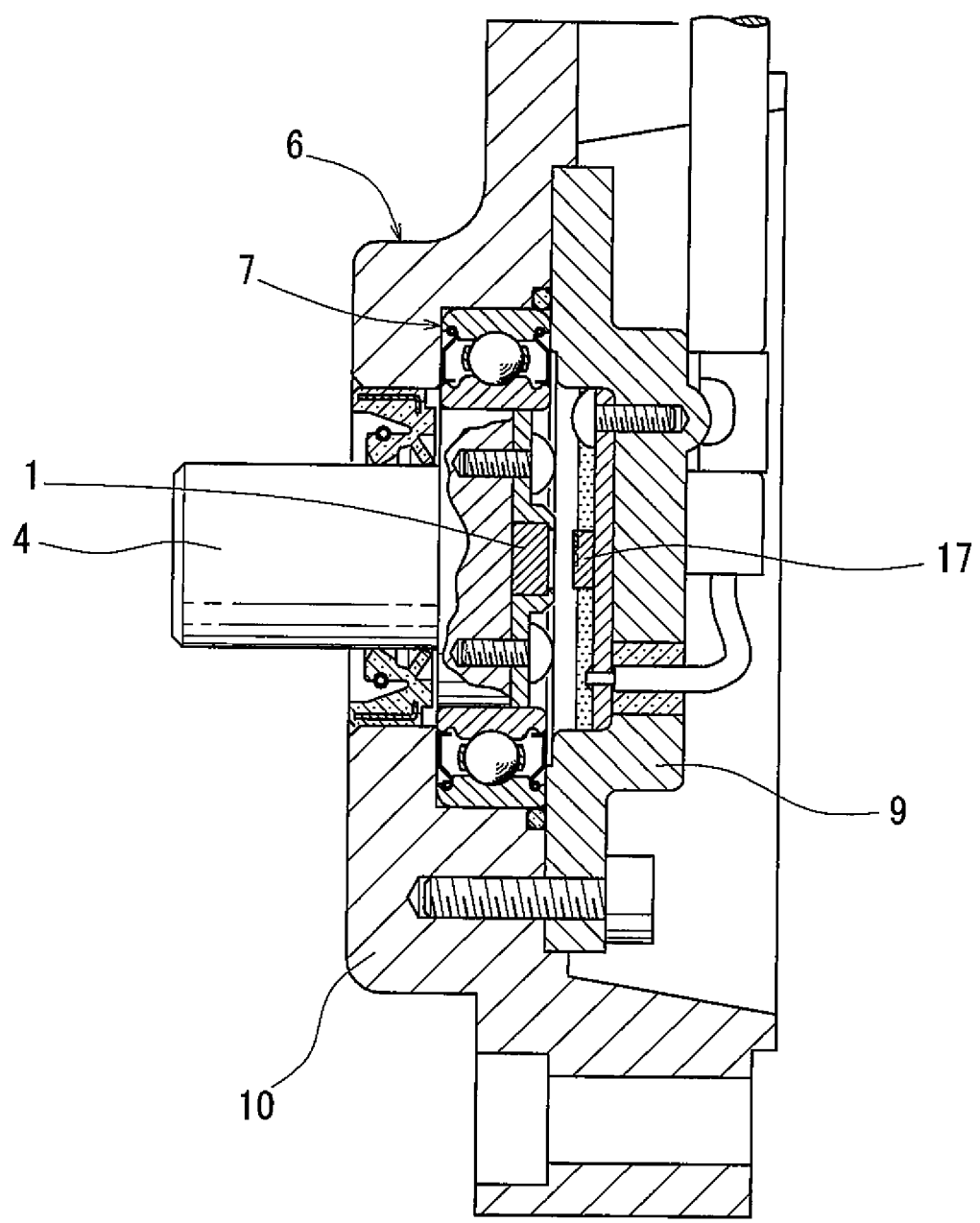
FIG. 11 is a vertical sectional side view showing a modification of Example 1.

The bearing unit 7 is configured by one pair of antifriction bearings in a plurality of lines between the shaft 4 and the housing main body 10. The bearing unit 7 is not limited to a bearing unit of a specific type and, as illustrated in FIG. 11, can also be configured by a rolling bearing in a single line or a slide bearing.

The antifriction bearing configuring the bearing unit 7 has a positive radial clearance. A decentering amount caused by fits between the rolling bearing and the housing main body 10 and the shaft 4 does not substantially generate. Therefore, the radical clearance set between the housing main body 10 and the shaft 4 is determined by a positive radical clearance, and the decentering amount δ in FIG. 1 is based on the radial clearance. For this reason, as the bearing unit 7, a bearing unit having rigidity that can maintain decentering within the decentering amount δ in FIG. 1 is employed. The magnet diameter of the permanent magnet 1 is 10 times or more the sum of the maximum diameter d of the same circumference and the radial clearance corresponding to the radial clearance.

The housing lid 9 is fixed on one end side of the housing main body 10 in which a bearing seating that supports the outer ring of the rolling bearing is formed. The circuit board 8 is fixed to the flat portion 9a of the housing lid 9.

By using the housing lid 9, a preload can be also given to the bearing unit 7. In this case, in an illustrated normal unit assembling state, the center of axis of the shaft 4 may be regarded to be on the straight line L including the center line of the permanent magnet 1 or the like, and the decentering amount δ and the inclination of the shaft 4 are only slightly generated when a load is excessively given to the shaft 4. For this reason, it can be understood that the magnet diameter of the permanent magnet 1 may be 5 times or more the sum of the maximum diameter d of the same circumference and an expected decentering amount δ.

More specifically, when the housing lid 9 is screwed to the housing main body 10, the rolling bearing of the bearing unit 7 is sandwiched between the shoulder of the housing main body 10 and the housing lid 9 by screwing force to give a predetermined preload to the rolling bearing. Since the preload is given to the rolling bearing, bearing rigidity can be improved to make it possible to prevent the shaft 4 from being decentered. As shown in the drawing, when the rolling bearing is directly pushed by the housing lid 9 to give the preload, a contact portion 9b to an outer ring 11 is arranged around the flat portion 9a. The preload is not limited to the preload in the embodiment in which the rolling bearing is directly pushed by the housing lid 9 in the axial direction, and the rolling bearing can also be pushed by interposing a space between the rolling bearing and the housing lid. When a simple flat housing lid is desired to be used, a spacer may be employed.

In order to easily fix the housing 6 to another member, an outer flange 10a is preferably arranged on the housing main body 10. A through hole for screwing is formed in the outer flange 10a.

A portion between an inner circumference on the other end of the housing main body 10 and the shaft 4 is preferably sealed by a seal 12. Magnetic powder can be prevented by the seal 12 from being penetrated into the housing 6. For the same purpose, a slinger 13 is more preferably arranged on the outside of the seal 12. Alternatively, a portion between the housing lid 9 and the housing main body 10 is also preferably sealed by an O ring 14.

The shaft 4 includes a magnet holder 15 that holds the permanent magnet 1. An inner ring 16 is arranged such that one end 16a of a fitting surface of the inner ring 16 projects from a one-end portion of the shaft 4. Since the one-end portion 16a of the fitting surface of the inner ring 16 projects from one end of the shaft 4, a peripheral portion 15a of the magnet holder 15 can be fitted to the one-end portion 16a. With this fitting, the permanent magnet 1 held by the magnet holder 15 can be positioned in a radial direction. Thus, the permanent magnet 1 can be easily positioned in a radial direction.

The magnet holder 15 holds the permanent magnet 1 by a cylindrical portion 15b in which an external diameter surface of the permanent magnet 1 is fitted and a retaining portion 15c overlapping one end face of the permanent magnet 1 fitted in the cylindrical portion 15b. When the external diameter surface of the permanent magnet 1 is fitted in the cylindrical portion 15b, the permanent magnet 1 can be positioned in a radial direction with reference to the peripheral portion 15a of the magnet holder 15. The shaft 4 is positioned by the support of the bearing unit 7 in an axial direction with reference to the housing 6. In the state the magnet holder 15 is fixed to one end of the shaft 4, the permanent magnet 1 supported on one end of the shaft 4 is not displaced on the other end side. Thus, the gap g between the permanent magnet 1 and the magnet sensors 2 and 3 fixed to the housing lid 9 can be maintained by the retaining portion 15c overlapping one end face of the permanent magnet 1.

For example, when the permanent magnet 1 is a ferrite magnet having a diameter of 4 mm to 20 mm and an axial length of 3 mm to 5 mm, the gap g can be arbitrarily employed in a value ranging from 0.5 mm to 3.0 mm. In particular, when the gap g is increased, as the permanent magnet, a ferrite magnet having a diameter of 4 mm to 6 mm and an external length of 3 mm to 5 mm is preferably employed.

The retaining portion 15c overlaps a radial region portion exceeding 80% of a permanent magnet radius r on one end face of the permanent magnet 1. For this reason, the retaining portion 15c does not hinder the setting of the gap g, and the gap g can be set to be freely narrowed regardless of the axial length of the retaining portion 15c. The magnet holder 15 can be easily manufactured by resin injection molding. As a final fixing means of the magnet holder 15, screwing for one end of the shaft 4 can be employed.

The circuit board 8 is fixed to the flat portion 9a in a state in which an integrated circuit 17 including a sensor array is mounted on one board surface on the other end side and a cable 18 is connected to the circuit board 8. The cable 18 connected to the circuit board 8 is extracted from a cable port of the housing lid 9 to the outside. When single-side mounting is performed on the board surface on the other side of the circuit board 8, the board surface of one end side of the circuit board 8 is directly supported on the flat portion 9a facing one end of the shaft 4 in the axial direction. For this reason, a spacer used when the circuit board 8 is screwed can be omitted.

The flat portion 9a of the housing lid 9 is recessed on one end side from a contact portion 9b to the outer ring 11 arranged around the flat portion 9a. When the flat portion 9a is recessed on one end side, the circuit board 8 can be easily sealed with a resin by using the inner wall of the recessed portion of the flat portion 9a as a mold. When the flat portion 9a is recessed from the contact portion 9b to prevent the flat portion 9a from being in contact with a side surface on one end side of the inner ring 16 projecting from one end of the shaft 4, even though the outer ring 11 and the inner ring 16 have the same widths, the inner ring 16 and the housing lid 9 are not in contact with each other.

The circuit board 8 is sealed with a resin on one end side with reference to the other end of the integrated circuit 17 to prevent the circuit board 8 from reaching a portion between the plurality of magnet sensors 2 and 3 and one end face of the permanent magnet 1. The plurality of magnet sensors 2 and 3 may be considered to be substantially located at the other end of the integrated circuit 17 with respect to an axial position. After the resin sealing, the housing lid 9 is fixed to the housing main body 10. Since a resin seal layer 19 is formed on one end side with reference to the other end of the integrated circuit 17, the resin seal layer 19 does not hinder the setting of the gap g between the permanent magnet 1 and the plurality of magnet sensors 2 and 3.

The cable port of the housing lid 9 is also blocked by a resin seal layer 20. Since the cable port is covered with the circuit board 8 screwed in the flat portion 9a, a sealing resin for the circuit board 8 and the cable port is easily filled. Since resin filling for the circuit board 8 and resin filling for the cable port can be separated from each other, both the resin seal layers 19 and 20 can be formed by resins of different types, respectively. In particular, since the resin seal layer 19 for the circuit board 8 is located in the housing 6, a resin seal layer having vibration absorbability higher than that of the resin seal layer 20 is preferably employed. Since the resin seal layer 20 for the cable port is located outside the housing 6, a resin seal layer having a mechanical strength, a weather resistance, and a waterproof property better than those of the resin seal layer 19 for the circuit board 8 is preferably employed.

After the resin sealing of the circuit board 8, the shaft 4, the bearing unit 7, and the like are incorporated in the housing main body 10, and the housing lid 9 can be fixed to the housing main body 10. By the fixing, the plurality of magnet sensors 2 and 3 can be fixed at a position axially spaced by the gap g apart from the central portion A of one end face of the permanent magnet 1 in a state free from decentering (see FIG. 1(c)). In this manner, the plurality of magnet sensors 2 and 3 are arranged to detect radial magnetic flux densities at a position spaced by the gap g apart from the central portion A of one end face of the permanent magnet 1 even though decentering amount δ is generated.

The housing lid 9, the shaft 4, the outer ring 11 and the inner ring 16 of the bearing unit 7, and a rolling element 21 are made of arbitrary ferromagnetic materials, respectively. By the fixing of the housing lid 9, contact between the outer ring 11 of the rolling bearing on one side and the contact portion 9b is secured, and a magnetic shield is formed by the rolling bearing, the contact portion 9, and the shaft 4 that are made of the ferromagnetic materials. When a preload is employed, contact between the contact portion 9b and the outer ring 11 can be more ensured. The magnetic shield is a ferromagnetic shield that is arranged such that all magnetic field lines straight extending from the outside of the housing 6 to the magnet sensors 2 and 3 cross any one of the housing lid 9, the shaft 4, the inner ring 16, and the outer ring 11. The plurality of magnet sensors 2 and 3 are arranged in a magnetic shield space in which the magnetic shield is effective. Magnetic field lines of an external magnetic field cannot straightly reach the plurality of magnet sensors 2 and 3, and are guided to a detour formed by the housing lid 9, the outer ring 11, the rolling element 21, the inner ring 16, and the shaft 4 that are successive. For this reason, a detection error of a magnetic flux density caused by the external magnetic field can be prevented.

The ferromagnetic material is not limited to a specific ferromagnetic material. For example, when a bearing steel is employed, in the past, the magnetic shield space can be formed by using a rolling bearing having the inner ring, the outer ring, and the rolling element that are made of a conventionally general bearing steel and a shaft and a housing lid for a general structure. The housing main body 10 is made of an antiferromagnetic material such as an aluminum alloy or a resin for weight saving.

Figure 12:
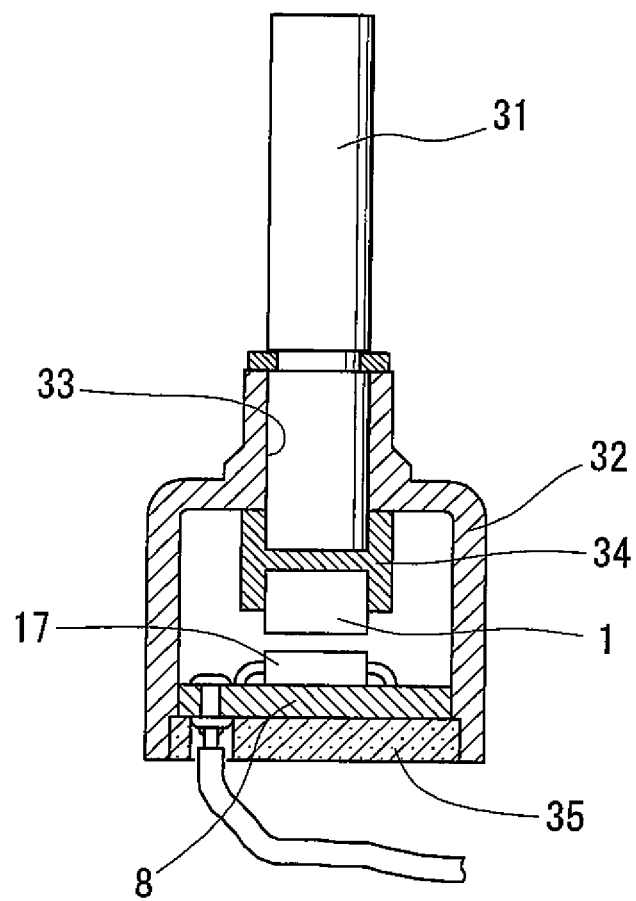
FIG. 12 is a vertical sectional side view of the rotating angle detecting sensor according to Example 2.

Example 2 is shown in FIG. 12. Example 2 is configured as a sensor unit in which a shaft 31 is rotatably supported by a bearing unit 33 arranged on an inner circumference of a housing main body 32. The bearing unit 33 is configured by a slide bearing. Although the example in which the bearing unit 33 is formed on the inner circumference of the housing main body 32 is described above, another slide bearing may be incorporated. A radial clearance is formed between the shaft 31 and the bearing unit 33. A decentering amount is determined on the radial clearance. The permanent magnet 1 is fixed to a magnet holder 34 configuring one end of the shaft 31. As in Example 1, the integrated circuit 17 is arranged at a predetermined position by fixing a housing rid 35.

The technical scope of the invention is not limited to the above embodiments, and includes all changes within the scope of technical ideas based on the scope of claims.

REFERENCE NUMERALS

1 Permanent magnet
2,3 Magnetic sensor
4, 31 Shaft
5 Sensor array
6 Housing
7, 33 Bearing unit
8 Circuit board
9, 35 Housing lid
9a Flat portion
9b Contact portion
10, 32 Housing main body
11 Outer ring
16 Inner ring
16a One-end portion of fitting surface
17 Integrated circuit
19,20 Resin seal layer
21 Rolling element
A Central portion
d Maximum diameter of same circumference
g Gap
δ Decentering amount

The invention claimed is:

1. A rotating angle detecting sensor comprising: a columnar permanent magnet; and a plurality of magnetic sensors arranged entirely within a circle axially spaced apart from an end face of the permanent magnet, the permanent magnet being formed with a uniform material, having a columnar shape, and being radially double-pole-magnetized;
wherein the permanent magnet is formed by a ferrite magnet or an alnico magnet having a diameter of 4 mm to 20 mm and an axial length of 3 mm to 5 mm,
wherein the plurality of magnetic sensors is arranged to detect a radial magnetic flux density at a position spaced 0.5 mm to 3.0 mm apart from a central portion of the permanent magnet, the central portion having a diameter equal to or smaller than 20% of the magnet diameter on the end face of the permanent magnet, and
wherein the circle has a diameter equal to or smaller than 20% of the magnet diameter and is configured to be concentric with the permanent magnet.

2. The rotating angle detecting sensor according to claim 1, wherein the diameter of the central portion is equal to or smaller than 10% of the magnet diameter on the end face of the permanent magnet.

3. The rotating angle detecting sensor according to claim 1, wherein the magnet diameter is 5 times or more a sum of a maximum diameter of the circle and a decentering amount allowed between a center of the circle and a center line of the permanent magnet.

4. The rotating angle detecting sensor according to claim 3, comprising: a shaft to which the permanent magnet is fixed; and a housing that supports the shaft by a bearing unit and in which the plurality of magnetic sensors is fixed, wherein the decentering amount is determined based upon a radial clearance set between the shaft and the housing.

5. The rotating angle detecting sensor according to claim 4, wherein the permanent magnet is fixed to an end of the shaft, and the magnet diameter is 10 times or more the sum of the maximum diameter of the circle and the radial clearance.

6. The rotating angle detecting sensor according to claim 3, wherein the plurality of magnetic sensors is integrated to form a sensor array.

7. The rotating angle detecting sensor according to claim 1, comprising: a shaft, a housing that supports the shaft with a bearing unit, and a circuit board on which the plurality of magnetic sensors is mounted, wherein the permanent magnet is fixed to a first end of the shaft, a second end of the shaft is exposed to an exterior of the housing, and the housing contains the permanent magnet and the plurality of magnetic sensors and has a housing lid having a flat portion facing the first end of the shaft in an axial direction, and the circuit board is fixed to the flat portion of the housing lid.

8. The rotating angle detecting sensor according to claim 7, wherein the bearing unit comprises a rolling bearing incorporated between the shaft and the housing, and an outer ring of the bearing unit is pushed by the housing lid to apply a preload.

9. The rotating angle detecting sensor according to claim 7, wherein the housing lid, the shaft, an inner ring and the outer ring of the bearing unit, and a rolling element are made of a ferromagnetic material, a contact portion for the outer ring is arranged around the flat portion of the housing lid, and the plurality of magnetic sensors is arranged in a magnetic shield space formed by the housing lid, the shaft, and the bearing unit.

10. The rotating angle detecting sensor according to claim 7, wherein the flat portion is recessed from the circumference of the housing lid on an end side, and the circuit board is sealed with a resin such that the circuit board does not reach a portion between the plurality of magnetic sensors and the end face of the permanent magnet.

11. The rotating angle detecting sensor according to claim 1, comprising: a shaft made of a ferromagnetic material; and a housing that supports the shaft with a bearing unit, wherein the permanent magnet is fixed to an end of the shaft, the housing contains the permanent magnet and the plurality of magnetic sensors, the plurality of magnetic sensors is located in a magnetic shield space formed by the shaft and another member, and the permanent magnet is a ferrite magnet.

* * * * *